(12) United States Patent
Nitschke et al.

(10) Patent No.: US 10,214,440 B2
(45) Date of Patent: Feb. 26, 2019

(54) METHOD FOR FORMING A HOT GLASS SHEET WITH TRANSVERSE CURVATURE

(71) Applicant: GLASSTECH, INC., Perrysburg, OH (US)

(72) Inventors: Dean M. Nitschke, Maumee, OH (US); David B. Nitschke, Perrysburg, OH (US)

(73) Assignee: GLASSTECH, INC., Perrysburg, OH (US)

(*) Notice: Subject to any disclaimer, the term of this patent is extended or adjusted under 35 U.S.C. 154(b) by 126 days.

(21) Appl. No.: 15/286,681

(22) Filed: Oct. 6, 2016

(65) Prior Publication Data
US 2017/0022087 A1  Jan. 26, 2017

Related U.S. Application Data

(62) Division of application No. 14/174,245, filed on Feb. 6, 2014, now abandoned.

(51) Int. Cl.
*C03B 23/035* (2006.01)
*C03B 23/03* (2006.01)
*C03B 35/20* (2006.01)

(52) U.S. Cl.
CPC .......... *C03B 23/0357* (2013.01); *C03B 23/03* (2013.01); *C03B 23/035* (2013.01); *C03B 23/0355* (2013.01); *C03B 35/202* (2013.01); *C03B 2225/02* (2013.01)

(58) Field of Classification Search
CPC ... C03B 23/0357; C03B 23/03; C03B 23/035; C03B 23/0355; C03B 35/202
See application file for complete search history.

(56) References Cited

U.S. PATENT DOCUMENTS

| | | |
|---|---|---|
| 3,806,312 A | 4/1974 | McMaster et al. |
| 3,934,970 A | 1/1976 | McMaster et al. |
| 3,947,242 A | 3/1976 | McMaster et al. |
| 3,994,711 A | 11/1976 | McMaster |
| 4,202,681 A | 5/1980 | McMaster et al. |
| 4,204,854 A | 5/1980 | McMaster et al. |
| 4,222,763 A | 9/1980 | McMaster et al. |
| 4,356,018 A | 10/1982 | McMaster |
| 4,386,952 A | 6/1983 | Nitscke |

(Continued)

FOREIGN PATENT DOCUMENTS

| | | |
|---|---|---|
| CN | 1436154 A | 8/2003 |
| CN | 101291883 A | 10/2008 |

(Continued)

OTHER PUBLICATIONS

PCT International Search Report and Written Opinion of the International Searching Authority dated Apr. 15, 2015, Application No. PCT/US15/12566, Applicant Glasstech, Inc., 8 Pages.

(Continued)

*Primary Examiner* — Queenie S Dehghan
(74) *Attorney, Agent, or Firm* — Brooks Kushman P.C.

(57) ABSTRACT

A glass sheet press forming station (32) and method for press forming hot glass sheets with transverse curvature is performed by initially limiting the central forming of a glass sheet (G) between its end portions upon pickup from a roll conveyor to an upper mold (38) and prior to press forming with an associated lower mold (66) to prevent central area optical distortion of the press formed glass sheet.

11 Claims, 5 Drawing Sheets

(56) References Cited

U.S. PATENT DOCUMENTS

| | | |
|---|---|---|
| 4,661,141 A | 4/1987 | Nitschke et al. |
| 5,147,439 A | 9/1992 | Ritz |
| 5,900,034 A | 5/1999 | Mumford et al. |
| 5,906,668 A | 5/1999 | Mumford et al. |
| 5,917,107 A | 6/1999 | Ducat et al. |
| 5,925,162 A | 7/1999 | Nitschke et al. |
| 5,974,836 A | 11/1999 | Radermacher et al. |
| 6,032,491 A | 3/2000 | Nitschke et al. |
| 6,079,094 A | 6/2000 | Ducat et al. |
| 6,173,587 B1 | 1/2001 | Mumford et al. |
| 6,418,754 B1 | 7/2002 | Nitschke et al. |
| 6,422,040 B1 | 7/2002 | McMaster et al. |
| 6,718,798 B2 | 4/2004 | Nitschke et al. |
| 6,729,160 B1 | 5/2004 | Nitschke et al. |
| 7,716,949 B2 | 5/2010 | Bennett et al. |
| 8,132,428 B2 | 3/2012 | Vild et al. |
| 8,573,005 B2 | 11/2013 | Dannoux et al. |
| 2004/0107729 A1 | 6/2004 | Fukami et al. |
| 2007/0089459 A1 | 4/2007 | Vild et al. |
| 2008/0245107 A1 | 10/2008 | Bennett |
| 2015/0218030 A1 | 8/2015 | Nitschke et al. |

FOREIGN PATENT DOCUMENTS

| | | |
|---|---|---|
| CN | 101801865 A | 8/2010 |
| EP | 0298426 A2 | 1/1989 |
| EP | 0613864 A1 | 9/1994 |
| JP | 2004051404 A | 2/2004 |
| JP | 3717339 B2 | 11/2005 |
| RU | 2 081 067 C1 | 6/1997 |
| RU | 2 393 123 C2 | 6/2010 |
| WO | 00/07948 A1 | 2/2000 |

OTHER PUBLICATIONS

Supplementary European Search Report dated Jul. 12, 2017, European Application No. 15 746 294.6, Applicant Glasstech, Inc., 12 Pages.

Australian Examination Report No. 1 dated Dec. 19, 2017, Application No. 2015214534, Applicant Glasstech, Inc., 3 Pages.

Russian Acceptance Decision dated Aug. 14, 2018, Application No. 2016131877/03, 13 Pages.

Chinese Office Action dated May 18, 2018, Application No. 201580007571.0, Applicant Glasstech, Inc, 9 Pages.

Taiwanese Search Report dated Oct. 1, 2017, Application No. 104103264, 1 Page.

Taiwanese Office Action dated Oct. 17, 2018, Application No. 104103264, 7 Pages.

METHOD FOR FORMING A HOT GLASS SHEET WITH TRANSVERSE CURVATURE

CROSS-REFERENCE TO RELATED APPLICATIONS

This application is a divisional of U.S. patent application Ser. No. 14/174,245 filed on Feb. 6, 2014, by Dean M. Nitschke and David B. Nitschke under the title FORMING STATION AND METHOD FOR FORMING A HOT GLASS SHEET WITH TRANSVERSE CURVATURE, the disclosure of which is hereby incorporated in its entirety by reference herein.

TECHNICAL FIELD

This invention relates to a method for forming a hot glass sheet with transverse curvature having improved optics.

BACKGROUND

U.S. Pat. No. 4,661,141 Nitschke et al. discloses a glass sheet press bending system for bending hot glass sheets by conveying a hot glass sheet to below an upper mold that is moved downwardly to receive a hot glass sheet and provide support thereof by upwardly directed gas jets supplied from below a plane of conveyance of a roll conveyor and by a vacuum drawn at the upper mold, and the upper mold is then moved upwardly with the glass sheet supported thereon by contact with two thirds or more of the downwardly facing surface along the length of the glass sheet. When glass sheets are formed with transverse curvature, i.e., curvature in directions that cross each other without any straight line elements, the periphery of the glass sheet has excess glass that can cause excess pressure between the mold and the glass sheet at the center of the glass sheet and thereby result in undesirable optics both as to reflection and to transmission in the central viewing area of the glass.

In connection with the type of system disclosed by the aforementioned U.S. Pat. No. 4,661,141, see also U.S. Pat. No. 5,900,034 Mumford et al.; U.S. Pat. No. 5,906,668 Mumford et al.; U.S. Pat. No. 5,917,107 Ducat et al.; U.S. Pat. No. 5,925,162 Nitschke et al.; U.S. Pat. No. 6,032,491 Nitschke et al.; U.S. Pat. No. 6,079,094 Ducat et al.; U.S. Pat. No. 6,173,587 Mumford et al.; U.S. Pat. No. 6,418,754 Nitschke et al.; U.S. Pat. No. 6,718,798 Nitschke et al.; and U.S. Pat. No. 6,729,160 Nitschke et al.

SUMMARY

An object of the present invention is to provide an improved method for forming a hot glass sheet with transverse curvature.

In carrying out the above object, the method is performed on a hot glass sheet that has a pair of spaced end portions with distal extremities and that also has an intermediate portion extending between its end portions, and the method commences by conveying the hot glass sheet on a conveyor into a heated chamber of a forming station to below an upper mold that is located above the conveyor and has a downwardly facing surface that has a downwardly convex shape with curvature in transverse directions. The upper mold is then moved downwardly from an upper position to a lower position adjacent the glass sheet on the conveyor and operation of a gas lift jet array provides upwardly directed lift jets as the sole impetus for lifting the glass sheet from the conveyor and contacting the intermediate portion of the glass sheet with the downwardly facing surface of the upper mold for less than 50% of the distance between the distal extremities of the end portions of the glass sheet, whereupon the upper mold and the glass sheet are moved upwardly to the upper position of the upper mold. A lower mold having a ring shape, that faces upwardly with a concave shape in transverse directions complementary to the downwardly convex shape of the downwardly facing surface of the upper mold, is then moved horizontally within the heated chamber to a location above the conveyor and below the upper mold in its upper position with the glass sheet supported on the upper mold, and the upper mold is then moved downwardly and a vacuum is drawn at the downwardly facing surface of the upper mold to press form the glass sheet between the upper and lower molds and provide curvature of the glass sheet in transverse directions, whereupon the upper mold is moved upwardly to its upper position with the press formed glass sheet supported on the upper mold by the vacuum drawn at its downwardly facing surface. Then, a delivery mold is moved to below the press formed glass sheet on the upper mold in its upper position whereupon the vacuum drawn at the upper mold is terminated to release the glass sheet from the upper mold onto the delivery mold which is then moved out of the forming station for delivery of the press formed glass sheet.

As disclosed, the method is performed by terminating the operation of the gas lift jet array before completion of the press forming of the glass sheet between the upper and lower molds, and preferably the operation of the gas lift jet array is terminated as the downward movement of the upper mold with the glass sheet supported thereon begins the press forming of the glass sheet between the upper and lower molds.

As disclosed, gas pressures that are respectively supplied to the end portions and to the intermediate portion of the glass sheet are controlled to limit the extent of the intermediate portion of the glass sheet that contacts the downwardly facing surface of the upper mold. More specifically, a lesser glass pressure is disclosed as being supplied to the end portions of the glass sheet than to the intermediate potion of the glass sheet, with the gas pressure supplied to the end portions of the glass sheet being 50 to 75% of the gas pressure supplied to the intermediate portion of the glass sheet.

In an alternate practice of the method, a pair of positioners are moved to blocking positions below the upper mold prior to operation of the gas lift jet array to limit upward movement of the end portions of the glass sheet toward the downwardly facing surface of the upper mold and thereby limit the extent of the intermediate portion of the glass sheet that initially contacts the downwardly facing surface of the upper mold, and the pair of positioners are subsequently moved from their blocking positions to unblocking positions to permit the subsequent press forming of the glass sheet between the upper and lower molds. As disclosed, the pair of positioners are moved between the blocking and unblocking positions about respective pivotal connections thereof on the upper mold.

After the press forming operation between the upper and lower molds, the press formed glass sheet is disclosed as being moved on the delivery mold from the forming station to a quench station for quenching.

In performing the preferred practice of the method, the operation of the gas lift jet array is terminated as the downward movement of the upper mold with the glass sheet supported thereon begins the press forming of the glass sheet between the upper and lower molds, and the press formed glass sheet is moved on the delivery mold from the forming station to the quench station for quenching.

The objects, features and advantages of the present invention are readily apparent from the detailed description of the preferred embodiments when taken in connection with the referenced drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to practice the present invention.

Figure 1:
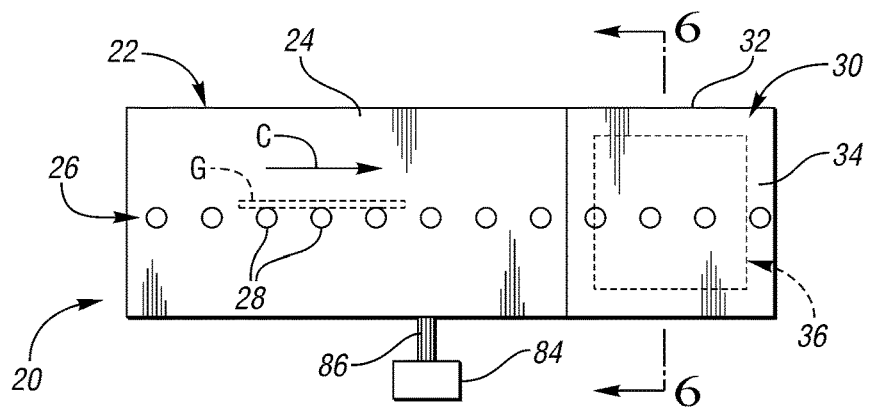
FIG. 1 is a schematic elevational view of a glass sheet processing system including a forming station that performs the method of the invention.
Figure 6:
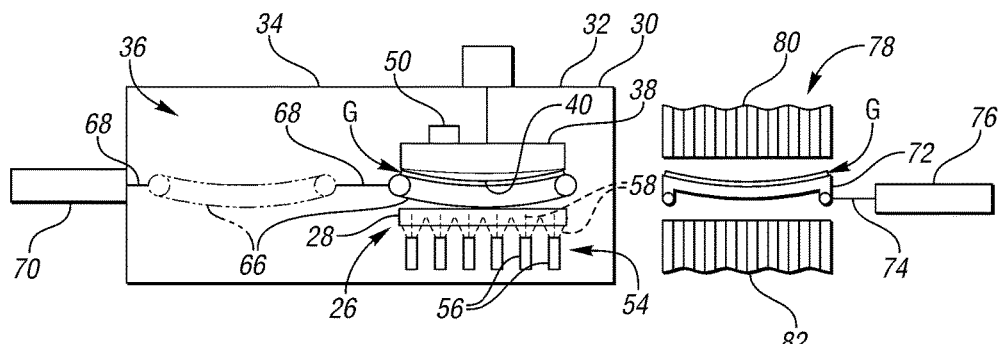
FIG. 6 is a sectional view taken through the forming station along the direction of line 6-6 in FIG. 1 and shows a lower mold that is movable from a phantom line indicated idle position to a solid line indicated use position below the upper mold whose downward movement from the position of FIG. 5 with the glass sheet thereon provides press forming of the glass sheet with transverse curvature after which the upper mold and the glass sheet are moved upwardly and a delivery mold is moved to below the upper mold and then receives the press formed glass sheet which is moved out of the forming station for delivery such as to the illustrated quench station for cooling.

With reference to FIG. 1, a glass sheet forming system generally indicated by 20 includes a furnace 22 having a heating chamber 24 for providing a heated ambient for heating glass sheets. A conveyor 26 of the system conveys the heated glass sheet in a generally horizontally extending orientation and is preferably of the roll conveyor type including rolls 28 that are frictionally driven in the manner disclosed by U.S. Pat. No. 3,806,312 McMaster; U.S. Pat. No. 3,934,970 McMaster et al.; U.S. Pat. No. 3,947,242 McMaster et al.; and U.S. Pat. No. 3,994,711 McMaster et al. A press forming station 30 of the system 20 performs the method of the present invention and has a construction somewhat similar to that of the disclosure of the aforementioned U.S. Pat. No. 4,661,141 and the other United States patents set forth in the above Background section of this application. Furthermore, the press forming station 30 has an insulated housing 32 defining a heated chamber 34 in which press forming apparatus 36 of the press forming station is received as also shown in FIG. 6.

Figure 2:
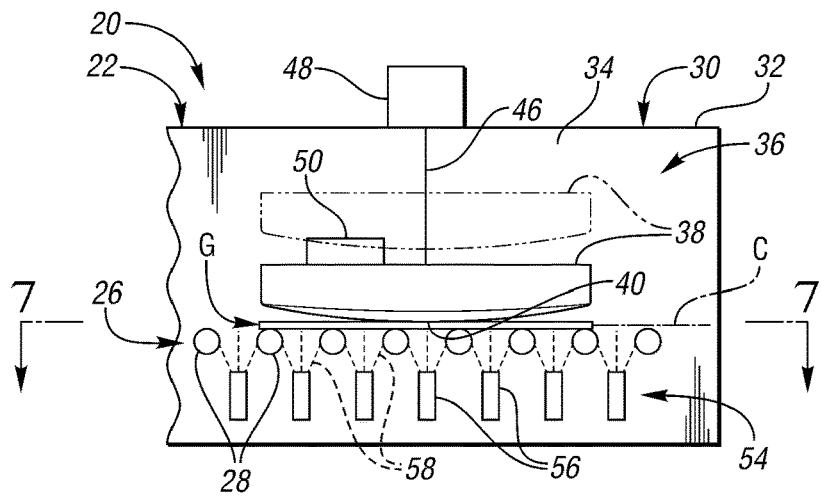
FIG. 2 is a schematic sectional view taken through the forming station in the same direction as FIG. 1 and illustrates an upper mold that is movable between a phantom line indicated upper position and a solid line indicated lower position for receiving a hot glass sheet to be formed with transverse curvature.
Figure 3:
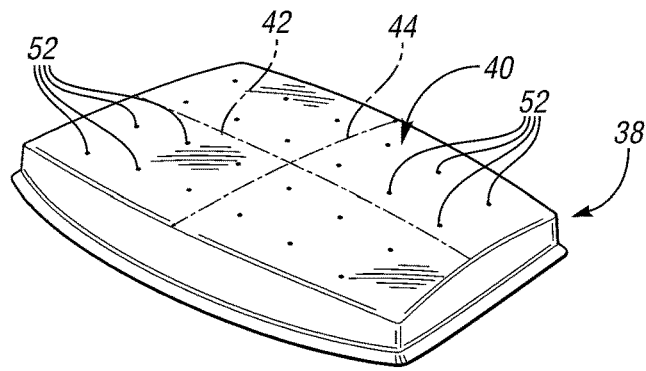
FIG. 3 is a perspective view of the upper mold with its lower downwardly convex surface shown facing generally upwardly for purposes of illustration.

As illustrated in FIGS. 2 and 3, the press forming apparatus includes an upper mold 38 located within the heated chamber 34 above the roll conveyor 26 and has a downwardly facing surface 40 with a downwardly convex shape having curvature in transverse directions, specifically as shown in FIG. 3 by the major curvature illustrated by phantom line 42 and the cross curvature shown by phantom line 44, thus without any straight line elements such as are present in cylindrical or conical shapes. This upper mold 38 is supported and moved by a connection 46 to an actuator 48 shown in FIG. 2 for movement between a phantom line indicated upper position above the roll conveyor 24 and a solid line indicated lower position adjacent the roll conveyor.

A schematically indicated source of vacuum 50 is shown in FIG. 2 as being mounted on the upper mold 38 and provides a vacuum through an array of vacuum holes 50 shown by FIG. 3 at the downwardly facing surface 40 of the upper mold. More specifically, the source of vacuum 50 is preferably of the type disclosed by U.S. Pat. No. 4,202,681 McMaster and U.S. Pat. No. 4,222,763 McMaster and is capable of drawing greater and lesser extensive vacuums as well as providing positive pressure air for providing glass sheet release as it is hereinafter more fully described.

As schematically illustrated in FIG. 2, the forming station 30 also includes a gas lift jet array 54 that is located below the plane of conveyance C of the glass sheet G on the roll conveyor 26 and includes gas jet pumps 56 that supply upwardly directed gas lift jets 58 for providing the sole impetus for lifting the glass sheet G upwardly from the roll conveyor to the upper mold 38 in its lower position. This lifting of the glass sheet as is hereinafter described limits the extent of contact of the glass sheet with the upper mold and the pressure therebetween in a manner that provides enhanced optical characteristics of the central viewing area of the glass sheet. The gas jet pumps are of the type disclosed by U.S. Pat. No. 4,204,854 McMaster et al. and U.S. Pat. No. 4,356,018 McMaster such that a primary gas flow therefrom induces a secondary gas flow many times the extent of the primary gas flow in order to provide the lifting.

Figure 4:
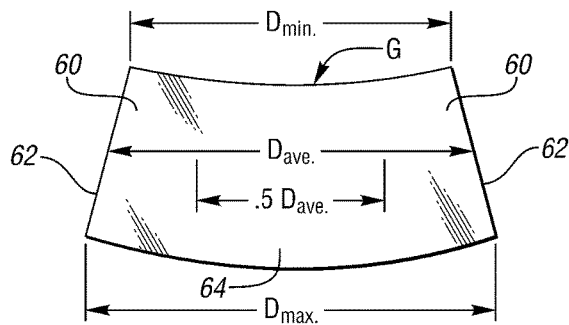
FIG. 4 is a plan view of a glass sheet that is to be processed by the system and that has a pair of spaced end portions and an intermediate portion extending between its end portions.

As illustrated in FIG. 4, the glass sheet G being formed has a pair of spaced end portions 60 with distal ends 62 and also has an intermediate portion 64 extending between its end portions. Glass sheets formed for vehicle side and back windows conventionally have a minimum distance $D_{min.}$ and a maximum distance $D_{max.}$ which result in an average distance $D_{ave.}$ between the distal extremities 62 of the end portions 60. This average distance $D_{ave.}$ for purposes of description in this application is hereinafter referred to as the "distance between the distal extremities of the end portions."

Figure 5:
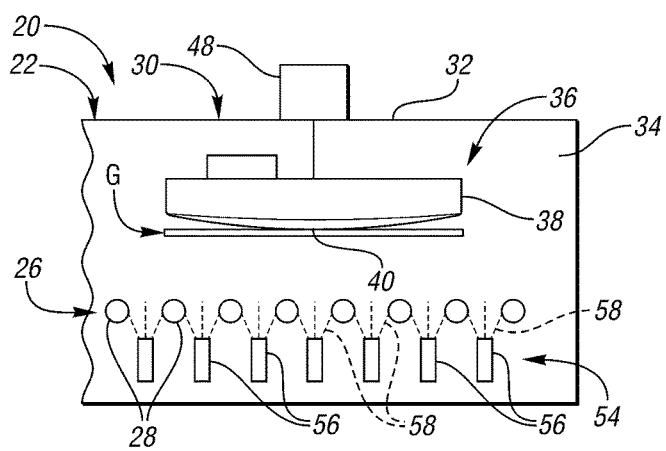
FIG. 5 is taken in the same direction as FIG. 2 but illustrates the glass sheet supported at its intermediate portion with its end portions spaced from the downwardly facing surface of the upper mold in order to initially limit the glass sheet forming at the more central glass sheet intermediate portion in a manner that provides improved optics at the central region of the finally press formed glass sheet.

Upon lifting the glass sheet from the roll conveyor 26 as shown in FIG. 2, the intermediate portion of the glass sheet contacts the downwardly facing surface 40 of the upper mold 38 for less than 50% of the distance between the distal extremities 62 of the end portions 60 of the glass sheet and the upper mold is then moved upwardly as shown in FIG. 5 with the end portions 60 spaced downwardly from the downwardly facing surface 40 of the upper mold. The gas lift jet array 54 continues to provide the sole support for the glass sheet at the upper mold without any vacuum then being drawn by the source of vacuum 50 at the mold surface 40. The limited extent of the contact of the glass sheet with the downwardly facing surface 40 of the upper mold 38 limits cross curvature so that excess peripheral glass is initially limited. This prevents abrupt curvature and resultant distortion both with respect to transmission and reflection in the intermediate portion of the glass sheet where optics are important.

Figure 7:
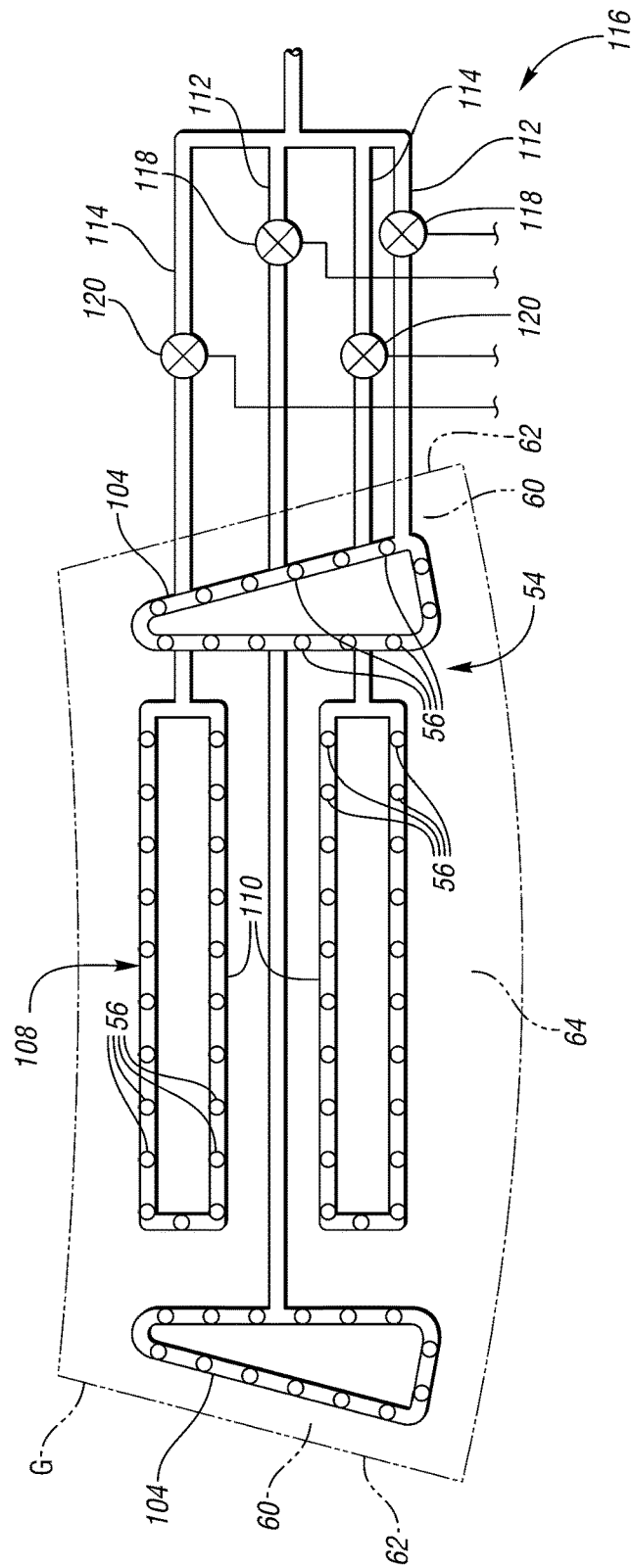
FIG. 7 is a plan view taken along the direction of line 7-7 in FIG. 2 to illustrate the construction of a gas lift jet array used to lift the glass sheet from the roll conveyor to the upper mold.

A lower mold 66 of the forming station 30 has a ring shape as shown in FIG. 7 facing upwardly with a concave shape in transverse directions complementary to the downwardly convex shape of the downwardly facing surface 40 of upper mold 38 shown in FIG. 3. This lower mold 66 is movable horizontally as shown in FIG. 6 by a connection 68 to an actuator 70 for movement horizontally within the heated chamber 34 from an idle or non-use position shown by phantom line representation to a use position shown by solid line representation at an elevation above the roll conveyor 26 to below the upper mold 38 in its upper position shown in FIG. 5 with the glass sheet G supported on the upper mold by the gas lift jet array 54. The upper mold 38 is then moved downwardly to the lower position shown in FIG. 6 and the vacuum source 50 then draws a vacuum at the downwardly facing surface 40 of the upper mold to provide press forming of the glass sheet between the upper and lower molds 38 and 66 and resultant curvature of the glass sheet in transverse directions. The upper mold 38 is then moved upwardly with the press formed glass sheet supported on the upper mold by the vacuum drawn at its downwardly facing surface by vacuum source 50, and a delivery mold 72 is then moved by a connection 74 to an actuator 76 to below the upper mold in its upper position whereupon the vacuum drawn at the upper mold by the vacuum source is terminated to release the glass sheet from the upper mold onto the delivery mold. The termination of the vacuum drawn at the upper mold may also be followed by positive pressure air supplied to the upper mold to release the glass sheet onto the lower mold which is then moved out of the forming station for delivery of the pressed formed glass sheet, which as disclosed is to a quench station 78 having upper and lower quench heads 80 and 82 that provide cooling of the glass sheet for heat strengthening or tempering.

A controller 84 shown in FIG. 1 has a bundle of control connections 86 for operating the system and the forming station to the operable components described above in order to provide the operation of the roll conveyor 26, the upper mold 38, the vacuum source 50, the gas lift jet array 54, the lower mold 66, the delivery mold 72 and the quench station 78 to provide the press forming of the glass sheet and its delivery.

Figure 8:
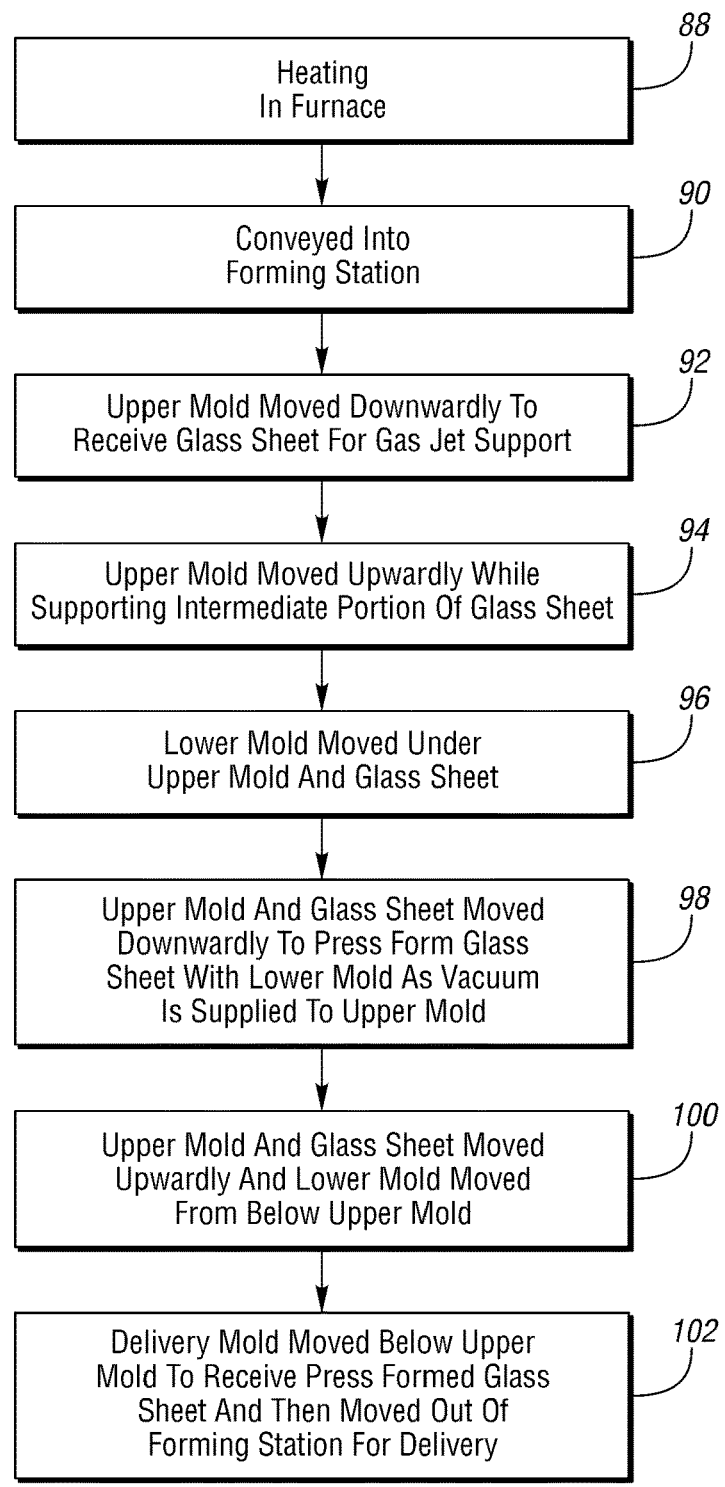
FIG. 8 is a flow chart that illustrates the press forming operation.

With reference to the flow chart of FIG. 8, the press forming operation begins by the heating 88 of the glass sheet G in the furnace and its subsequent conveyance 90 after heating into the forming station to begin the press forming operation. Then the downward movement of the upper mold as illustrated at 92 and its receipt of the glass sheet G for the support by the gas lift jets is followed by the upper mold upward movement 94 to support the intermediate portion of the glass sheet to a limited extent as described, followed by movement 96 of the lower mold below the upper mold and glass sheet in preparation for the press forming. The downward upper mold movement shown by 98 initiates the press forming of the glass sheet with the lower mold as vacuum is supplied to the upper mold as previously described to provide the press forming in transverse directions with optics that are enhanced by the initial limited contact of the glass sheet and limited transverse curvature upon the initial glass pickup from the conveyor. Thereafter, the operation 100 of the upper mold moving upwardly and the lower mold moving from below the upper mold is followed by the movement 102 of the delivery mold below the upper mold to receive the press formed glass sheet and the subsequent movement of the delivery mold out of the press forming station for delivery.

In the preferred practice of the press forming operation described above, the operation of the gas lift jet array 54 providing the upwardly directed gas lift jets 58 shown in FIG. 2 is terminated before completion of the press forming of the glass sheet between the upper and lower molds and is most preferably terminated as the downward movement of the upper mold 38 with the glass sheet supported thereon begins the press forming of the glass sheet between the upper and lower molds 38 and 66 as previously described.

With reference to FIG. 7, the gas lift jet array 54 disclosed includes a pair of end portions 104 that are aligned with the end portions 60 of the glass sheet to initially provide their lifting and support, and the gas lift jet array also includes a central portion 108 having a pair of branches 110 for providing the support and lifting of the intermediate portion of the glass sheet as described above. Pressurized gas that is heated during its flow into and then through a heating path in the heated chamber supply conduits 112 that supply pressurized gas to the end portions 104 and conduits 114 that supply pressurized gas to the central portion 108 in both of its branches 110. A control generally indicated by 116 includes valves 118 that adjustable control the pressure supplied to the conduits 112 feeding the end portions 104 and the control 116 also includes valves 120 that adjustably control the gas pressure supplied by the conduits 114 to the branches 110 of the central portion 108. Of course, the valving and control for supplying the gas array end portions 104 and the central portion 108 can also be constructed in different ways than the specific way shown to adjustable control the amount of lifting and support at the end portions and intermediate portion of the glass sheet. This operation takes place during the downward upper mold movement step shown by 92 in FIG. 8 and during the upper mold upward movement shown in step 94 as well as during the lower mold movement under the upper mold as shown by step 96 and through the downward movement of the upper mold to the commencement of the press forming shown by step 98. More specifically, there most often will be a lesser gas pressure supplied to the end portions 60 of the glass sheet than to its intermediate portion, which end portions supply pressure will normally be in the range of about 50 to 75% of the gas pressure supplied to the intermediate portion for many press forming operations on conventional glass with transverse curvature.

Figure 9:
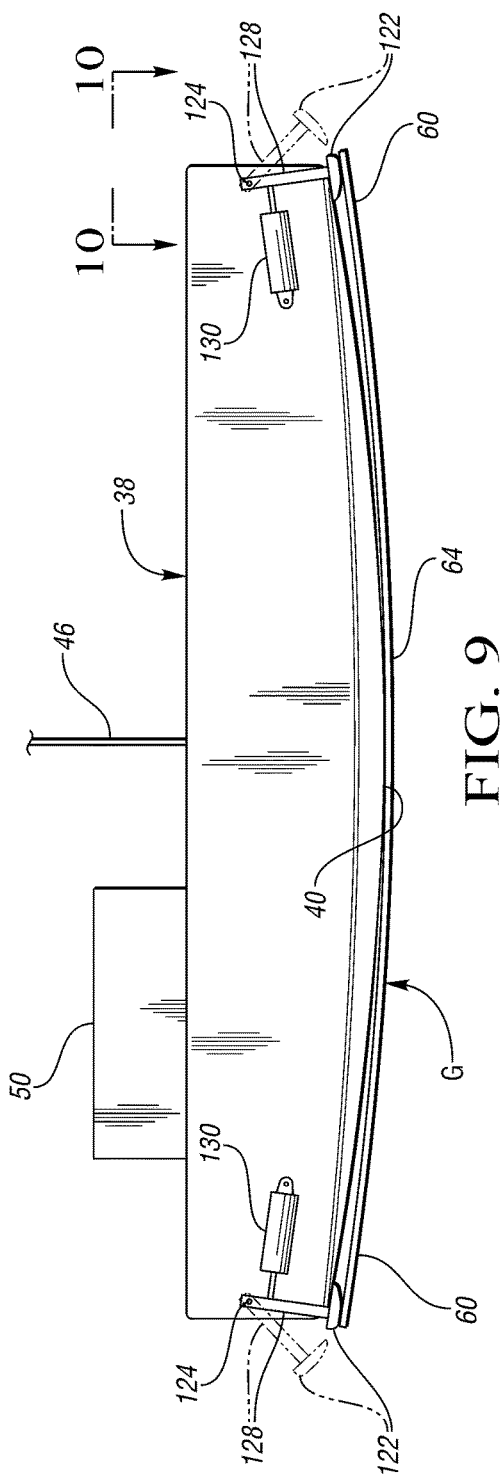
FIG. 9 is a partial view taken in the same direction as FIG. 5 to illustrate an alternate embodiment of a forming station for performing the method of the invention and includes positioners movable to solid line indicated blocking positions to limit initial contact of the glass sheet with the downwardly facing surface of the upper mold prior to the press forming operation, and the positioners are subsequently movable to phantom line indicated unblocking positions to permit the press forming of the glass sheet between the upper and lower molds.

With reference to FIG. 9, an alternate embodiment of the forming station for performing the glass forming method of the invention has a pair of positioners 122 that are moved to solid line indicated blocking positions below the upper mold 38 prior to operation of the gas lift jet array as previously described to limit upward movement of the end portions 60 of the glass sheet G toward the downwardly facing surface 40 of the upper mold. The positioners 122 thus function to limit the extent of the intermediate portion 64 of the glass sheet that contacts the downwardly facing surface 40 of the upper mold 38 upon the initial pickup from the roll conveyor as described above and upon the upward movement in preparation for the press forming. The pair of positioners 122 are subsequently moved from their blocking positions to unblocking positions shown by phantom line representation to permit the subsequent press forming of the glass sheet between the upper mold 38 and the lower mold 66 as previously described.

Figure 10:
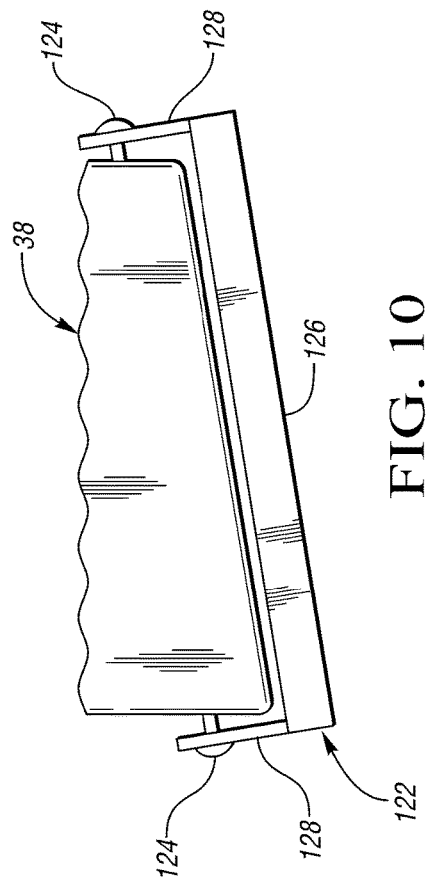
FIG. 10 is a top plan view taken along the direction of line 10-10 of FIG. 9 to further illustrate the construction of the positioners used in the forming method.

As disclosed, the blocking members 122 have pivotal connections 124 to the upper mold 38 and, more specifically as shown in FIG. 10 each have a positioner portion 126 with opposite ends supported by legs 128 that are connected to the upper mold by the pivotal connections 128. Actuators 130 extend between the upper mold 38 and the positioner legs 128 and under the operation of the controller 84 provide the movement between the blocking and unblocking positions as previously described.

All of the previously mentioned patents are assigned to the applicant of the present application and are hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a hot glass sheet having a pair of spaced end portions with distal extremities and also having an intermediate portion extending between its end portions, the method comprising:

conveying the hot glass sheet on a conveyor into a heated chamber of a forming station to below an upper mold that is located above the conveyor and has a downwardly facing surface that has a downwardly convex shape with curvature in transverse directions;

moving the upper mold downwardly from an upper position to a lower position adjacent the glass sheet on the conveyor and operating a gas lift jet array to provide upwardly directed gas lift jets as the sole impetus for lifting the glass sheet from the conveyor and contacting the intermediate portion of the glass sheet with the downwardly facing surface of the upper mold for less than 50% of the distance between the distal extremities of the end portions of the glass sheet, and then moving the upper mold and the glass sheet upwardly to the upper position of the upper mold;

then moving a lower mold having a ring shape, that faces upwardly with a concave shape in transverse directions complementary to the downwardly convex shape of the downwardly facing surface of the upper mold, horizontally within the heated chamber to a location above the conveyor and below the upper mold in its upper position with the glass sheet supported on the upper mold and subsequently moving the upper mold downwardly and drawing a vacuum at the downwardly facing surface of the upper mold to press form the glass sheet between the upper and lower molds and provide curvature of the glass sheet in transverse directions, whereupon the upper mold is moved upwardly to its upper position with the press formed glass sheet supported on the upper mold by the vacuum drawn at its downwardly facing surface;

a pair of positioners being moved to blocking positions below the upper mold prior to operation of the gas lift jet array to limit upward movement of the end portions of the glass sheet toward the downwardly facing surface of the upper mold and thereby limit the extent of the intermediate portion of the glass sheet that initially contacts the downwardly facing surface of the upper mold, and the pair of positioners subsequently being moved from their blocking positions to unblocking positions to permit the subsequent press forming of the glass sheet between the upper and lower molds; and then moving a delivery mold to below the press formed glass sheet on the upper mold in its upper position whereupon the vacuum drawn at the upper mold is terminated to release the glass sheet from the upper mold onto the delivery mold which is then moved out of the forming station for delivery of the press formed glass sheet.

2. A method for forming a hot glass sheet as in claim 1 wherein the operation of the gas lift jet array is terminated before completion of the press forming of the glass sheet between the upper and lower molds.

3. A method for forming a hot glass sheet as in claim 1 wherein the operation of the gas lift jet array is terminated as the downward movement of the upper mold with the glass sheet supported thereon begins the press forming of the glass sheet between the upper and lower molds.

4. A method for forming a hot glass sheet as in claim 1 wherein gas pressures are respectively supplied to the end portions and to the intermediate portion of the glass sheet and are controlled to limit the extent of the intermediate portion of the glass sheet that contacts the downwardly facing surface of the upper mold.

5. A method for forming a hot glass sheet as in claim 4 wherein a lesser gas pressure is supplied to the end portions of the glass sheet than to the intermediate portion of the glass sheet.

6. A method for forming a hot glass sheet as in claim 5 wherein the gas pressure supplied to the end portions of the glass sheet is 50 to 75% of the gas pressure supplied to the intermediate portion of the glass sheet.

7. A method for forming a hot glass sheet as in claim 1 wherein the pair of positioners are moved between the blocking and unblocking positions about respective pivotal connections thereof on the upper mold.

8. A method for forming a hot glass sheet as in claim 1 wherein the press formed glass sheet is moved on the delivery mold from the forming station to a quench station for quenching.

9. A method for forming a hot glass sheet having a pair of spaced end portions with distal extremities and also having an intermediate portion extending between its end portions, the method comprising:

conveying the hot glass sheet on a conveyor into a heated chamber of a forming station to below an upper mold that is located above the conveyor and has a downwardly facing surface that has a downwardly convex shape with curvature in transvers directions;

moving the upper mold downwardly from an upper position to a lower position adjacent the glass sheet on the conveyor and operating a gas lift jet array to provide upwardly directed gas lift jets as the sole impetus for lifting the glass sheet from the conveyor, the gas pressures being respectively supplied to the end portions and to the intermediate portion of the glass sheet and are controlled to limit the extent of the intermediate portion of the glass sheet that contacts the downwardly facing surface of the upper mold, a lesser gas pressure being supplied to the end portions of the glass sheet than to the intermediate portion of the glass sheet to contact the intermediate portion of the glass sheet with the downwardly facing surface of the upper mold for less than 50% of the distance between the distal extremities of the end portions of the glass sheet, and then moving the upper mold and the glass sheet upwardly to the upper position of the upper mold;

then moving a lower mold having a ring shape, that faces upwardly with a concave shape in transverse directions complementary to the downwardly convex shape of the downwardly facing surface of the upper mold, horizontally within the heated chamber to a location above the conveyor and below the upper mold in its upper position with the glass sheet supported on the upper mold and subsequently moving the upper mold downwardly and drawing a vacuum at the downwardly facing surface of the upper mold to press form the glass sheet between the upper and lower molds and provide curvature of the glass sheet in transverse directions, whereupon the upper mold is moved upwardly to its upper position with the press formed glass sheet supported on the upper mold by the vacuum drawn at its downwardly facing surface;

the operation of the gas lift jet array being terminated as the downward movement of the upper mold with the glass sheet supported thereon begins the press forming of the glass sheet between the upper and lower molds;

then moving a delivery mold to below the press formed glass sheet on the upper mold in its upper position whereupon the vacuum drawn at the upper mold is terminated to release the glass sheet from the upper mold onto the delivery mold which is then moved out of the forming station for delivery of the press formed glass sheet; and the press formed glass sheet being moved on the delivery mold from the forming station to a quench station for quenching.

10. A method for forming a hot glass sheet having a pair of spaced end portions with distal extremities and also having an intermediate portion extending between its end portions, the method comprising:

conveying the hot glass sheet on a conveyor into a heated chamber of a forming station to below an upper mold that is located above the conveyor and has a downwardly facing surface that has a downwardly convex shape with curvature in transverse directions;

moving the upper mold downwardly from an upper position to a lower position adjacent the glass sheet on the conveyor and operating a gas lift jet array to provide upwardly directed gas lift jets as the sole impetus for lifting the glass sheet from the conveyor and contacting the intermediate portion of the glass sheet with the downwardly facing surface of the upper mold for less than 50% of the distance between the distal extremities of the end portions of the glass sheet by supplying gas pressures to the end portions and to the intermediate portion of the glass sheet with the gas pressure supplied to the end portions of the glass sheet being 50 to 75% of the gas pressure supplied to the intermediate portion of the glass sheet and then moving the upper mold and the glass sheet upwardly to the upper position of the upper mold;

then moving a lower mold having a ring shape, that faces upwardly with a concave shape in transverse directions complementary to the downwardly convex shape of the downwardly facing surface of the upper mold, horizontally within the heated chamber to a location above the conveyor and below the upper mold in its upper position with the glass sheet supported on the upper mold and subsequently moving the upper mold downwardly and drawing a vacuum at the downwardly facing surface of the upper mold to press form the glass sheet between the upper and lower molds and provide curvature of the glass sheet in transverse directions, the operation of the gas lift jet array being terminated as the downward movement of the upper mold with the glass sheet supported thereon begins the press forming of the glass sheet between the upper and lower molds, and subsequent to the press forming the upper mold being moved upwardly to its upper position with the press formed glass sheet supported on the upper mold by the vacuum drawn at its downwardly facing surface; and then moving a delivery mold to below the press formed glass sheet on the upper mold in its upper position whereupon the vacuum drawn at the upper mold is terminated to release the glass sheet from the upper mold onto the delivery mold which is then moved out of the forming station to a quench station for tempering.

11. A method for forming a hot glass sheet having a pair of spaced end portions with distal extremities and also having an intermediate portion extending between its end portions, the method comprising:

conveying the hot glass sheet on a conveyor into a heated chamber of a forming station to below an upper mold that is located above the conveyor and has a downwardly facing surface that has a downwardly convex shape with curvature in transverse directions;

moving the upper mold downwardly from an upper position to a lower position adjacent the glass sheet on the conveyor and with a pair of positioners moved to blocking positions below the upper mold, then operating a gas lift jet array to provide upwardly directed gas lift jets as the sole impetus for lifting the glass sheet from the conveyor and contacting the intermediate portion of the glass sheet with the downwardly facing surface of the upper mold for less than 50% of the distance between the distal extremities of the end portions of the glass sheet by supplying gas pressures to the end portions and to the intermediate portion of the glass sheet with the gas pressure supplied to the end portions of the glass sheet being 50 to 75% of the gas pressure supplied to the intermediate portion of the glass sheet and its forming of the end portions of the glass sheet being limited by the positioners, and then moving the upper mold and the glass sheet upwardly to the upper position of the upper mold and moving the positioners to unblocking positions from under the upper mold;

then moving a lower mold having a ring shape, that faces upwardly with a concave shape in transverse directions complementary to the downwardly convex shape of the downwardly facing surface of the upper mold, horizontally within the heated chamber to a location above the conveyor and below the upper mold in its upper position with the glass sheet supported on the upper mold and subsequently moving the upper mold downwardly and drawing a vacuum at the downwardly facing surface of the upper mold to press form the glass sheet between the upper and lower molds and provide curvature of the glass sheet in transverse directions, the operation of the gas lift jet array being terminated as the downward movement of the upper mold with the glass sheet supported thereon begins the press forming of the glass sheet between the upper and lower molds, and subsequent to the press forming the upper mold being moved upwardly to its upper position with the press formed glass sheet supported on the upper mold by the vacuum drawn at its downwardly facing surface; and then moving a delivery mold to below the press formed glass sheet on the upper mold in its upper position whereupon the vacuum drawn at the upper mold is terminated to release the glass sheet from the upper mold onto the delivery mold which is then moved out of the forming station to a quench station for tempering.

* * * * *